Oct. 30, 1934.    C. S. BRAGG ET AL    1,978,738
BRAKE SYSTEM FOR AUTOMOTIVE VEHICLES
Original Filed June 6, 1930    4 Sheets-Sheet 1
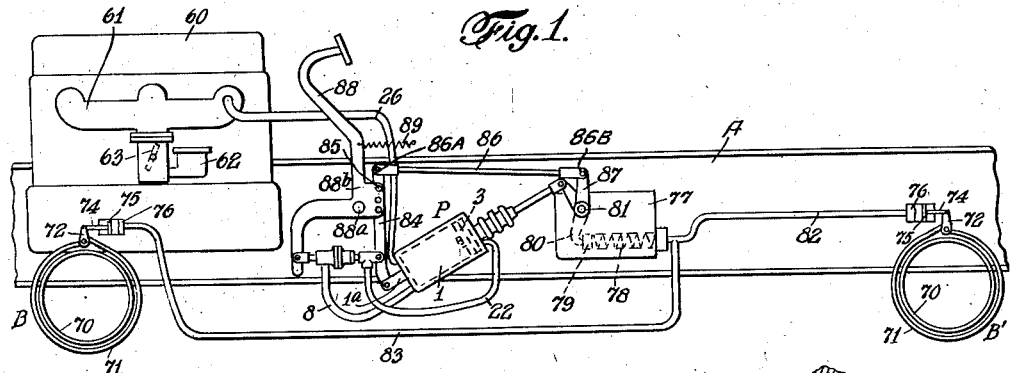
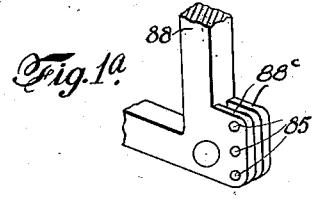
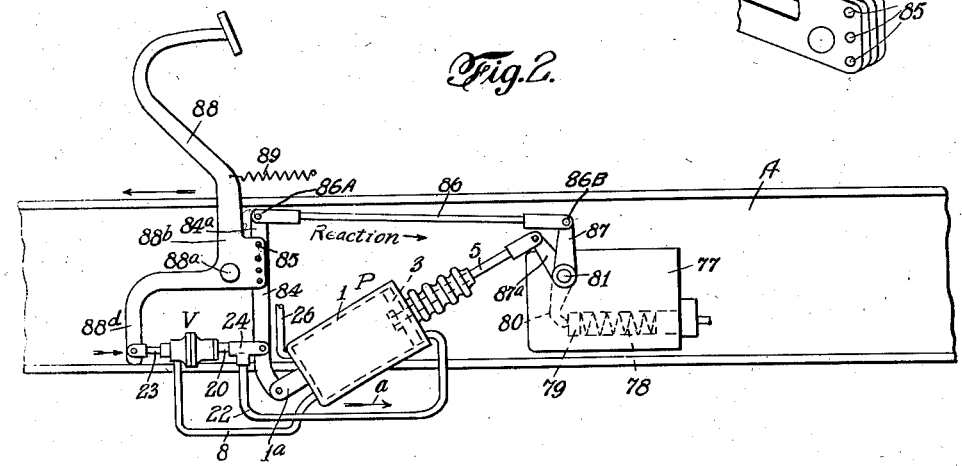
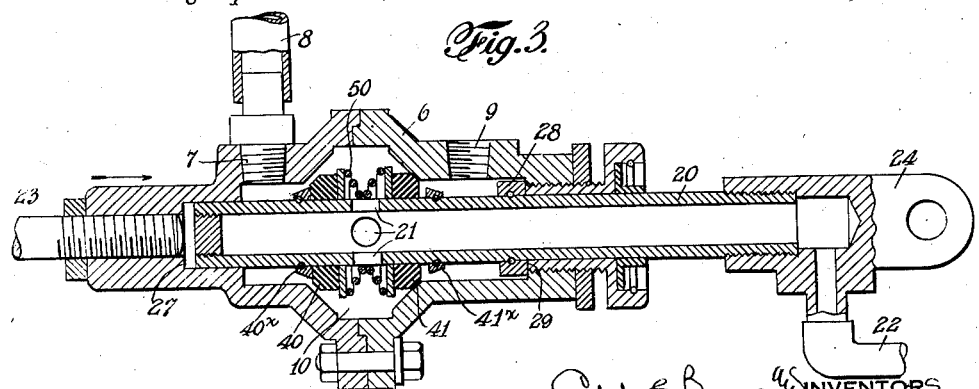

Oct. 30, 1934.  C. S. BRAGG ET AL  1,978,738
BRAKE SYSTEM FOR AUTOMOTIVE VEHICLES
Original Filed June 6, 1930  4 Sheets-Sheet 2
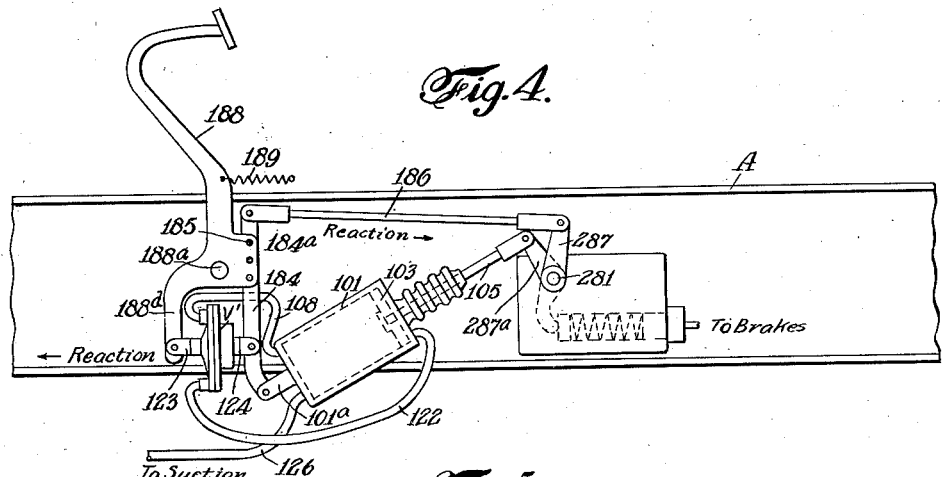
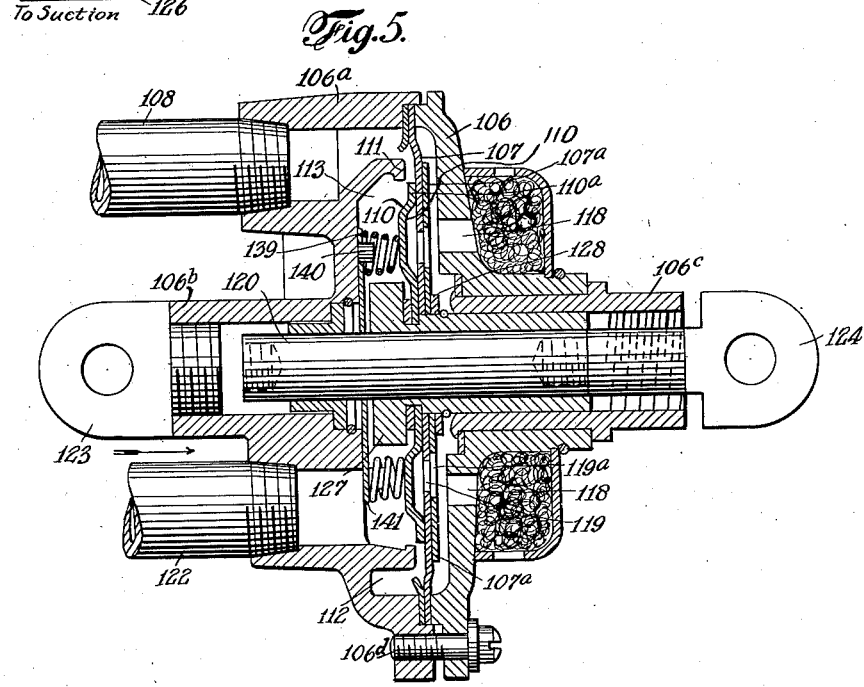
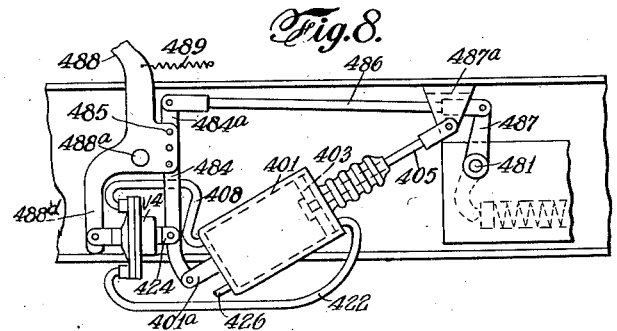

Oct. 30, 1934.   C. S. BRAGG ET AL   1,978,738
BRAKE SYSTEM FOR AUTOMOTIVE VEHICLES
Original Filed June 6, 1930    4 Sheets-Sheet 3

INVENTORS.
Caleb S. Bragg
Victor W. Kliesrath
BY Louis Prevost Whitaker
ATTORNEY

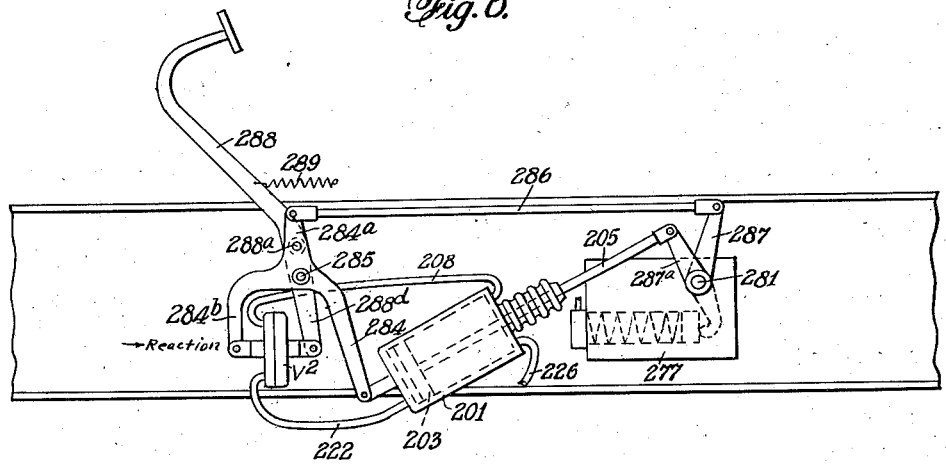
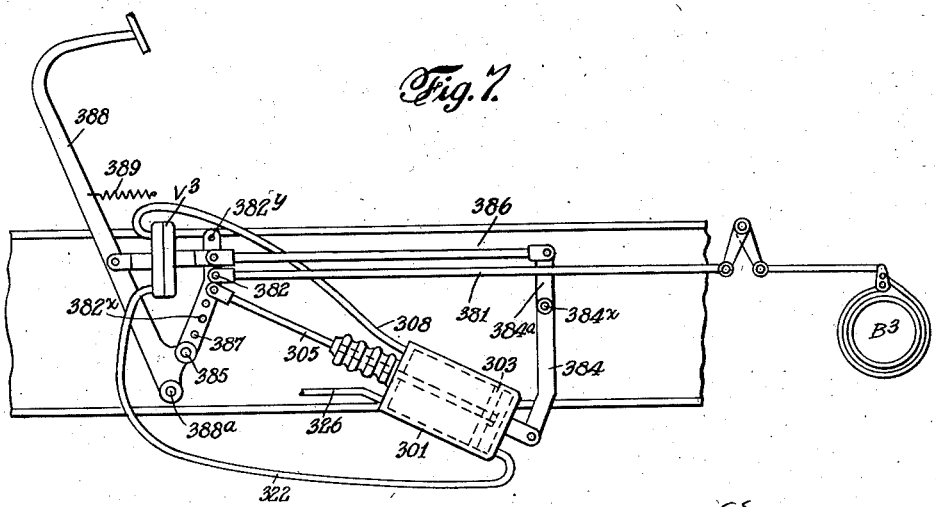

Patented Oct. 30, 1934

1,978,738

UNITED STATES PATENT OFFICE 1,978,738

BRAKE SYSTEM FOR AUTOMOTIVE VEHICLES

Caleb S. Bragg, Palm Beach, Fla., and Victor W. Kliesrath, South Bend, Ind., assignors to Bragg-Kliesrath Corporation, Long Island City, N. Y., a corporation of New York Application June 6, 1930, Serial No. 459,447
Renewed January 2, 1934

17 Claims. (Cl. 188—152)

Our invention consists in the novel features hereinafter described, reference being had to the accompanying drawings, which show several embodiments of the invention selected by us for purposes of illustration, and the said invention is fully disclosed in the following description and claims.

In the operation of brake systems for automotive vehicles, in which the brakes may be applied by a physically operable part or by a power actuator under the control of suitable valve mechanism, operated by the physically operable part, or by both sources of power, it has been found desirable to provide a reactionary force operative upon the physically operable part during the operation of the power actuator and approximately proportionate to the power exerted thereby, in order that the operator may be able to determine by the sense of "feel" the amount of power which the actuator is applying to the brake mechanism. It has been proposed to provide this reaction by connecting the brake mechanisms to a lever at a point between its connections with the physically operable part and the power actuator. It has also been proposed to obtain this reaction by means of a second piston or piston valve, which does no other work than to provide the reactionary force. It has also been proposed to obtain this reaction by providing valve mechanism located in the rodding or connections between the physically operable part and the brake mechanism, which valve mechanism is provided with parts subjected to the differentials of fluid pressures in the actuator during a power stroke thereof, acting against the movement of the physically operable part, the force required to overcome which reactionary force is transmitted to the brake mechanism.

Our present invention consists in a brake system for automotive vehicles of this general type, in which the brakes may be first applied by power which may be supplemented by the physical force of the operator by means of a power applying lever which is connected to the physically operated pivoted lever or pedal at two points, one of said connections providing lost motion for the operation of the controlling valve mechanism of the follow-up type, said lever being also connected with the movable part or parts of the power actuator and with the brakes in such a manner that part of the force of one movable part of the power actuator may be distributed in any desired proportion between the pedal and the brakes, and thus apprise the operator of the degree to which the brakes are being applied by power. In the preferred form of our invention, the power applying lever is pivotally connected with a physically operable pedal lever at points located eccentrically with respect to the pivotal axis of the latter, the controlling valve is interposed in one connection between said lever and the power applying lever and is operated by the relative movement of said power applying lever and pedal lever with respect to each other, around their other pivotal point of connection. In the preferred embodiments of our invention, we have also shown the power actuator comprising a cylinder and piston, both movable with respect to the vehicle for the purpose of utilizing the full stroke of these parts thus enabling the use of short levers, without increasing the diameter of the actuator cylinder.

Our invention also comprises certain novel features of construction and combination of parts hereinafter fully described and particularly pointed out in the claims.

Referring to the drawings, which illustrate several embodiments of the invention selected by us for purposes of illustration, Fig. 1 is a diagrammatic representation of our improved brake system applied to an automotive vehicle having four wheel hydraulic brakes and propelled by an internal combustion engine.

Fig. 1a is a detail perspective view of a portion of the pedal lever.

Fig. 2 is an enlarged detail view of a portion of the apparatus shown in Fig. 1.

Fig. 3 is an enlarged sectional view of one form of valve mechanism which may be employed.

Fig. 4 is a view similar to Fig. 2 showing a form of valve mechanism providing a reaction to the movement of the pedal lever by a differential of fluid pressures on portions of the valve mechanism, in addition to the reaction provided by the power applying lever.

Fig. 5 is an enlarged detail view of the valve mechanism illustrated in Fig. 4.

Fig. 6 is a view similar to Fig. 2, showing a modified construction.

Fig. 7 is a view similar to Fig. 2 showing another modification, and illustrating in dotted lines the connection of the power applying lever to the brake mechanism at different points in the lever.

Fig. 8 is a view similar to Fig. 2 showing a further slight modification.

Figure 5A:
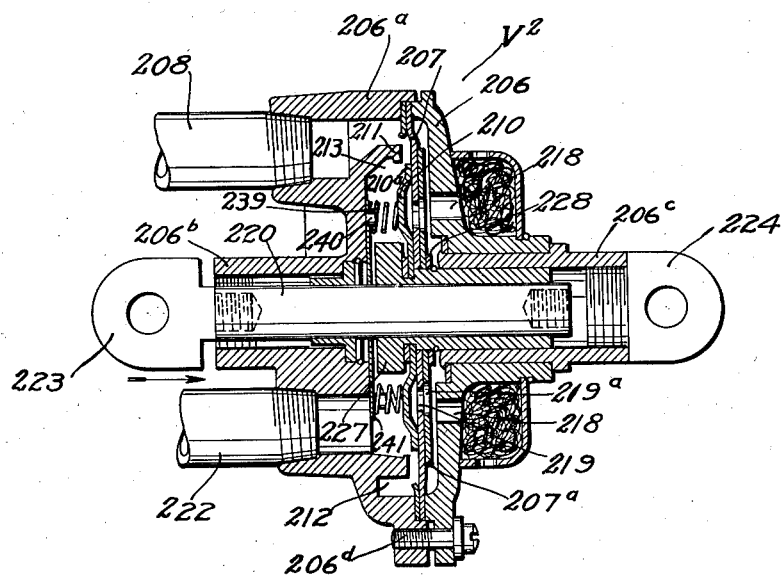
Figure 5a is an enlarged detail view of a modified form of valve mechanism similar in general detail to that disclosed in Figure 5.

Referring to the form of our invention shown in Figs. 1, 2 and 3, A represents a part of the 110 chassis or frame of an automotive vehicle provided with four wheel hydraulic brake mechanisms, one of the front wheel brake mechanisms being indicated at B, and one of the rear wheel brake mechanisms being indicated at B'. The brake mechanisms may be of any desired type. As shown, they each comprise the brake drum, 70, brake band, 71, brake applying lever, 72, in this instance connected with the piston rod, 74, of piston, 75, within a brake cylinder, 76. 77 represents the master cylinder unit of a well known hydraulic brake system, secured to the chassis in any desired manner, and comprising a pressure cylinder, 78, and a pressure piston, 79, located within a reservoir in the casing, the piston being operated by an arm, 80, on a rock shaft, 81. The master pressure cylinder, 78, is connected by piping, indicated at 82 and 83, with the front and rear wheel brake cylinders, 76. These parts are of any usual or preferred construction, and their specific construction forms no part of our present invention. 88 represents the usual brake lever or pedal lever, pivotally mounted on the chassis at 88$^a$, and 84 represents a power applying lever, which is pivotally connected at 85, between projecting lips, 88$^c$, on the brake lever, at a point between the ends of the power applying lever. The upper end of the power applying lever is pivotally connected at 86$^a$, with a rod, 86, the other end of which rod is pivotally connected, at 86$^b$, to an arm, 87, connected with the brake mechanism. In this instance, in which hydraulic brake applying means are shown, the arm, 87, is connected rigidly with the rock shaft, 81, of the master hydraulic pressure unit. The power actuator, indicated as a whole at P, is operated by differential of fluid pressures, and comprises the cylinder, 1, and piston, 3. The power actuator is preferably of the vacuum-balanced type as shown, i. e., in which the piston is subjected on both sides to vacuum when in the released position. In the present instance, the cylinder, 1, is closed at both ends, and both cylinder and piston are in this instance movable with respect to the vehicle, as well as movable with respect to each other. In this instance the cylinder, 1, is shown provided with a bracket, 1$^a$, which is pivotally connected with the lower end of the lever, 84, and a piston rod, 5, is pivotally connected in this instance to an arm, 87$^a$, also rigidly secured to the rock shaft, 81. The pivotal connections between the piston rod, 5, and arm, 87$^a$, is preferably in alignment with the pivotal connection between the rod, 86, and arm, 87, and obviously the same result could be obtained by connecting the piston rod and the rod 86, and arm, 87, both to the same arm, 87 or 87$^a$, if desired. The power applying lever, 84, is so constructed that the portion between its pivot, 85, and the point of connection with the actuator cylinder is a multiple of the length of the portion of said lever, indicated at 84$^a$, between the pivot, 85, and the connection with the link rod, 86. This short arm of the lever we term the amplifying arm, and it is obvious that the differential of fluid pressures on the cylinder will be applied to brake mechanism through the amplifying arm, 84, at an amplification corresponding with the respective effective lengths of the short and long arms of the lever, 84.

The pedal lever is provided with a downwardly extending arm, 88$^d$, between which and the power applying lever, 84, we find it convenient to insert the valve mechanism for controlling the power actuator. In Figs. 1 and 2 we have shown a form of valve mechanism in which no reactionary force is effected within the valve mechanism itself. The particular valve mechanism shown is covered by our former Patent No. 1,731,041, patented October 8, 1929, and will only be briefly described, to enable the operation of the invention to be understood. This valve mechanism comprises the valve casing, 6, having a suction aperture, 7, connected by a pipe, 8, in this instance with the head of cylinder, 1, on the forward side of the piston, the said portion of the cylinder being at all times connected by a suction pipe, 26, with a source of suction, in this instance with the intake manifold, 61, of the internal combustion engine, indicated at 60, provided with the usual carburetor, 62, and throttle valve, 63. When the throttle valve is closed and the engine is running, there will be a vacuum in the manifold between the throttle valve and the engine cylinders, represented by approximately twenty inches of mercury at sea level. The valve casing is also provided with an air inlet, 9, on the opposite side of the valve chamber 10, from the suction aperture, 7. Within the valve chamber we provide a suction valve 40, and air inlet valve, 41, formed preferably of molded cork, cork composition, rubber or other suitable material, having a sliding and sealing fit upon a valve actuating sleeve, indicated at 20, which is movable longitudinally with respect to the valve casing and carries collars, 40$^x$, 41$^x$, for unseating one valve after permitting the other to close, by a movement of the sleeve in either direction with respect to the casing. The valves are pressed toward their seats by a suitable spring, 50, and the collars, 40$^x$ and 41$^x$, are so placed that when the valve mechanism is in the released position, the suction valve, 40, will be held open and the air inlet valve, 41, will be seated. The valve actuating sleeve, 20, is provided with an aperture, 21, within the valve chamber, and is provided outside of the valve casing with a pipe connection, 22, leading to the portion of the cylinder in rear of the piston. The valve mechanism is adapted to be operated by a pushing action, and in this instance the valve casing is shown connected by rod, 23, with the arm, 88$^d$, of the pedal lever, while the valve actuating part, 20, is connected by the part, 24, with the lever, 84. Yielding means of any suitable character are provided for holding the parts in and returning them to released position. In this instance the pedal lever is shown provided with a retracting spring, 89, in the usual manner for this purpose.

Assuming that the parts are in the released position shown in Figs. 1, 2 and 3, and the engine is running, the forward end of the actuator cylinder will be evacuated through the pipe, 26, and the actuator cylinder in rear of the piston will likewise be evacuated through the pipe, 22, the valve mechanism, pipe, 8, and the suction pipe, 26, so that the piston is submerged in vacuum when in the released position. To effect an application of the brakes, the operator will place his foot on the pedal and depress it, thereby effecting a limited relative movement between the pedal lever and the power applying lever, 84, and shifting the valves with respect to the valve casing, so as to close the suction valve, 40, and open the air inlet valve, 41. This admits air to the cylinder in rear of the piston. As the degree of vacuum decreases in the space between the piston and the adjacent end of the cylinder, the maximum vacuum which is always maintained between the piston and the other end of the cylinder will cause the piston to move downwardly and forwardly, while the cylinder is moved upwardly and rearwardly, carrying with it the lower end of the power actuating lever, 84, tending to reseat the open suction valve unless the forward movement of the pedal is continued. The differential of fluid pressures on the piston will be directly applied to the brake mechanism through the rod, 86, the arm, 87, and the pedal lever, 88, through the connection, at 85.

The power of the cylinder will be exerted on the lower end of lever, 84, in the direction of the arrow, a, Fig. 2, and the draft of the rod, 86, on the upper end of the arm, 84ª, of the lever, 84, will be in the same direction, so that the lever, 84, is urged at both ends in a rearward direction in Fig. 2, and as the lever, 84, is pivoted at 85, to the pedal lever above its point of pivot, 88ª, this will exert a rearward pull on the pedal lever, which will be felt as a reactionary force on the foot of the operator. The greater the power exerted by the power actuator on the brakes, the greater will be this reactionary force, which obviously will vary in direct proportion to the force which the actuator is applying to the brakes, and this reactionary force will therefore advise the operator at all times as to the extent to which the brakes are being applied by power. The amount of reactionary force which is effective on the operator's foot depends upon the relative positions of the pivot point, 85, and the pedal with respect to the pivotal axis, 88ª, of the pedal lever, and these proportions or leverages will be determined with respect to the particular installation, or several holes may be provided in the projecting lips, 88ᶜ, of the pedal lever for the reception of the pivot, 85, as shown best in Fig. 1ª, so as to give the desired amount of reactionary force. When the valve mechanism is in the position to provide maximum differentials of pressure to the power actuator, i. e., when the atmospheric valve is fully open and the suction valve closed, the operator, by further depressing the pedal lever, can transmit physical force to the brake mechanism through the pedal extension, 88ᵈ, the valve mechanism, and the lever, 84, and the rod, 86. The limited lost motion between the pedal lever, 88, and the power applying lever, 84, is limited in this instance by means which limit the lost motion between the valve actuating part, 20, and the casing, 6, of the valve mechanism, but it could be limited in other ways. In Fig. 3, for example, we have shown the valve actuating part, 20, limited in one direction, in this instance the applied position, by shoulder, 27, on the valve casing, and in the other direction by a collar, 28, on the valve actuating sleeve, which engages the shoulder, 29, on the valve casing when the parts are in the released position.

It will also be seen in case of failure of power for any reason, the brakes can be applied in the usual manner, by the physical force of the operator. In such case, when the operator places his foot on the pedal and depresses the pedal lever, the valves will be placed in position to vent the cylinder, and as soon as the lost motion between the valve actuating sleeve and shoulder, 27, is taken up, the physical force of the actuator will be applied through the rod, 86, to the brake mechanism.

In Figs. 4 and 5, in which the parts corresponding to those previously described are given the same reference numerals with the addition of 100, we have illustrated a modification in which a different form of valve mechanism is employed, having parts which are subjected during a power stroke of the actuator to a differential of fluid pressures in the actuator, and transmitted to the pedal lever in a direction to resist the forward movement thereof, thus providing reactionary force which may be supplemented or added to by the reactionary force provided by the mounting of the power applying lever in the manner previously described. The use of the reactionary valve may be found desirable in some cases, as all of the physical force exerted to overcome the reaction of the valve is transmitted therethrough to the brake mechanism, whereas the physical force exerted to overcome the reaction of the lever, 84, is virtually wasted, as the brakes would be applied with as much force by the power actuator alone were the lever, 84, pivotally mounted to a fixed member at the pivotal point, 85. The physical force of the operator is not technically lost as the movement of the pedal lever in the direction to apply the brakes lessens the movement or stroke of the cylinder, but the operator is deprived of this amount of physical force which may be used to advantage in trucks to add the additional braking force required when the trucks are heavily laden, unless excessively powerful brakes are provided which are too powerful for the vehicle when empty or lightly laden. The construction and operation of the various parts shown in Fig. 4, exclusive of the valve mechanism, is the same as that shown and described with reference to Figs. 1 and 2, and need not be repeated. The valve mechanism shown in Fig. 4 is illustrated in section on an enlarged scale in Fig. 5, and the specific details thereof form no part of our present invention, as they are covered by our former application for Letters Patent filed September 12th, 1929, and given Serial No. 392,004. They will, however, be briefly described insofar as is necessary to an understanding of our present invention. The valve casing comprises two sections, 106 and 106ª, connected in any usual or preferred manner, in this instance by means of screws, 106ᵈ, and clamping between them the marginal edges of a diaphragm, 107. The section, 106ª, of the valve casing is provided with an annular seat, 111, to be engaged by the diaphragm, and when so engaged, this seat divides the interior of the casing into an annular suction chamber, 112, and a central chamber, 113. The suction chamber, 112, is connected by a suction pipe, 108, with the source of suction, preferably by connecting it with the cylinder, 101, forward of the piston, 103, as indicated in Fig. 4, this portion of the cylinder being at all times in communication with the intake manifold or other source of suction through the main suction pipe 126. The central chamber, 113, is connected by pipe, 122, with the actuator cylinder in rear of the piston. 120 represents the valve actuating part, which has a limited movement with respect to the valve casing, and is sealingly secured to the central portion of the diaphragm, 107, and is also provided with a disc valve, 110, having an annular seat, 110ª, adapted to seat on the diaphragm, and to hold the diaphragm unseated with respect to the seat, 111, when the parts are in released position, as shown in Fig. 5. In this instance the relative movement between the part, 120, and the valve casing is limited by collars, 127, 128, on the valve actuating part. The casing member, 106, is provided with apertures, 118, which connect the space between the disc valve and diaphragm with the atmosphere, through apertures, 119, in the diaphragm. In order to insure the proper seating of the diaphragm on the seat, 111, the diaphragm may be conveniently provided with a reinforcing plate, 107ª, having apertures, 119ª, therein, registering with the apertures, 119, in the diaphragm. Within the chamber, 113, of the casing member, 106ª, resistance means is provided for normally holding the disc valve seated on the diaphragm, and the diaphragm unseated. As shown, this resistance means comprises a circular series of springs, 139, interposed between the disc valve and the casing, and held in position by studs, 140, secured to a plate, 141. These springs are so calibrated as to slightly more than counterbalance the maximum differential of fluid pressures on the diaphragm and disc valve.

The valve mechanism shown in Fig. 5 is constructed to be operated either by a pulling or pushing action, and to this end each end of the valve actuating part is provided with an interiorly threaded recess, and each of the casing members is provided with an interiorly threaded sleeve extension, as indicated at 106$^b$ and 106$^c$. In this instance the valve is to be operated by a pushing action, and therefore the valve actuating part, 120, is connected by a part, 124, with the lever, 184, while the lower end of the arm or extension, 188$^d$, of the pedal lever, 188, is connected by a part, 123, with the sleeve, 106, of the casing.

The valve mechanism is shown in released position in Fig. 5. Assuming that the engine is running and that the throttle valve is closed, or partly closed, the portion of the actuator cylinder forward of the piston will be exhausted through pipe 126, and as the diaphragm, 107, is unseated, the portion of the cylinder in rear of the piston will likewise be exhausted through pipe, 122, chamber, 113, vacuum chamber, 112, pipe, 108.

When the pedal lever is depressed, the arm, 188$^d$, will move the valve casing rearwardly with respect to the valve actuating part, as indicated by the arrow in Fig. 5. This will effect the seating of diaphragm, 107, upon the seat, 111, cutting off the rear end of the cylinder from suction, after which the disc valve, 110, will be unseated to connect the chamber, 113, and the rear end of the cylinder with atmosphere, and initiating a power stroke of the actuator. The resistance springs, 139, offer comparatively small resistance to the seating of the diaphragm and unseating of the disc valve, as they are nearly counterbalanced by the differential of fluid pressures on the opposite faces of the diaphragm and disc valve, but as soon as the disc valve is unseated, this differential of fluid pressures gradually decreases, and the force of the resistance springs is gradually transferred to the disc valve and valve actuating part, and thence to the pedal lever, as a reactionary force.

This reactionary force of the valve mechanism is added to and supplemented by the reactionary force transmitted to the pedal lever by reason of the connection of the power applying lever, 184, at the point, 185, above the pivotal point, 188ª, of the pedal lever. The operation of the power actuator and its graduated control under the action of the valve mechanism, and the transmission of power directly from the piston to the brake mechanism and from the cylinder amplified through the lever, 184, and transmitted by rod, 186, will be exactly as hereinbefore described with reference to Figs. 1 and 2, but at each point in the stroke of the power actuator the operator will feel the reactionary force transmitted from the power actuator through the pivotal point, 185, and the reactionary force of the valve mechanism transmitted through the arm, 188$^d$, of the pedal lever, both of which will be substantially proportionate to the amount of power exerted by the power of the actuator on the brake mechanism.

In Fig. 6, in which the parts corresponding with those in Figs. 1 and 2 are given the same reference numerals with the addition of 200, we have illustrated an installation embodying a slight modification of our invention in which the valve is actuated by a pulling action, and the power amplifying lever is therefore pivoted to a depending portion of the pedal lever at a point below the pivotal support for the pedal lever. In this figure the pedal lever, 288, is pivoted to the chassis, at 288ª, and has a depending portion, 288$^d$. The power amplifying lever, 284, is pivoted at 285, to the pedal lever, and the upwardly extending arm 284ª, is connected by link rod, 286, with the brake mechanism. The lower end of the power amplifying lever, 284, is connected to the cylinder, 201, of the actuator, which is also of the vacuum-balanced type, and the piston, 203, has its piston rod, 205, connected with the brake mechanism. In this instance the piston rod, 205, and rod, 286, are connected respectively to arms, 287ª and 287, on the rock shaft, 281, of the hydraulic pressure unit, 277, the piston of which is the reverse of that shown in Fig. 4, for the reason that the piston of the actuator in this instance moves rearwardly, while the cylinder moves forwardly. The power amplifying lever, 284, is in this instance provided with a third arm, indicated at 284$^b$, and the valve mechanism indicated as a whole at V2, and which as shown is of the type illustrated in Fig. 5A, is supported between and connected to the depending portion, 288$^d$, of the pedal lever, and the arm, 284$^b$, of the power amplifying lever, so that the valve mechanism will be operated by a pulling action instead of a pushing action, as illustrated in Fig. 4. This is readily accomplished by connecting the arm, 288$^d$, with the valve casing part 224, Fig. 5A, and the arm, 284$^b$, with the valve actuating part, 223. The movement of the casing serves to successively seat the diaphragm 207 upon the seat 211 and unseat the disc valve 210 to initiate the power stroke of the actuator, all as heretofore described in explaining the operation of the valve of Fig. 5. In this instance the main suction pipe, 226, leading to the manifold, is connected to the rear end of the actuator cylinder, which portion of the cylinder is also connected to the annular suction chamber of the valve mechanism by pipe, 208. The forward end of the cylinder is in this instance alternately connected by the valve mechanism with suction and with the atmosphere through the connecting pipe, 222, all of said pipes having flexible portions to permit the relative movements of the piston and cylinder. The operation of the apparatus shown in Fig. 6 will be the same as that shown in Fig. 4, except that the valve mechanism is operated by a pulling action, and the power of the piston and cylinder is applied in a rearward direction, causing a forward pressure at the pivotal connection, 285, against the depending portion, 288$^c$, of the pedal lever, and providing a reactionary force to resist the foot of the operator, proportionate to the differential of fluid pressures in the actuator. In this instance the reactionary force provided in the valve mechanism due to differential of fluid pressures, will be added to and supplemented by the reactionary force exerted on the pedal lever through the pivotal connection, 285, by reason of the connection of the lower end of the depending portion of the pedal lever with the valve casing.

In Fig. 7, in which the parts corresponding with those in Figs. 1 and 2 are given the same reference numerals with the addition of 300, we have illustrated diagrammatically another installation embodying a slight modification of our invention, in which the power applying lever is pivotally connected with the pedal lever at a point above the pivotal support of the pedal lever and extends upwardly therefrom, the valve mechanism being interposed between the pedal lever and the power applying lever and operated by a pulling action as in Fig. 6, and the power amplifying lever being connected with the chassis, and the power applying lever being directly connected by rodding with the brake mechanism. The pedal lever, 388, is shown pivotally supported at 388ª, and the power applying lever, 387, is pivotally connected with the pedal lever at 385, at a point above the pivotal connection, 388ª. The power amplifying lever, 384, is in this instance pivoted at 384ˣ, to the chassis, and has its lower end connected with the cylinder, 301, of the actuator. The upwardly extending arm, 384ª, of the power amplifying lever is connected by the link rod, 386, with the upper end of the power applying lever, 387, and the piston rod, 305, of the actuator piston, 303, is also connected in this instance to the power applying lever, 387, at a point adjacent to the connection between the rod, 386, and said lever. The actuator is shown in the reverse of the position illustrated in Fig. 6, so that the piston moves in the forward direction, applying its power directly to the lever, 387, while the cylinder of the actuator moves rearwardly and applies its power amplified by the lever, 384, to the lever, 387, through the link rod, 386. The amplified power exerted by the cylinder will therefore react rearwardly at the pivotal point, 385, which being located above the pivotal support of the pedal lever, will provide a reactionary force therefor. The valve mechanism, V3, is here shown as being of the kind illustrated in Fig. 5, and is connected between the pedal lever and the upper end of the power applying lever, 387, so as to be operated by a pulling movement, as in Fig. 6, and the reaction of the valve mechanism will be added to the reaction provided from the actuator at the point, 385, in the pedal lever. In Fig. 7 the power applying lever, 387, is shown connected by a link rod, 381, with mechanically operated brake mechanisms, one of which is illustrated at B3, in any usual or desired manner, and the position of the point of connection, 382, between the rod, 381, and the lever, 387, will determine the amount of reaction imparted to the pedal lever from the actuator during its power stroke, as more power is transmitted through the power amplifying lever than through the piston. The nearer the point, 382, is to the pivotal connection, 385, the greater will be the amount of reaction imparted to the pedal lever from the actuator. For example, we have shown in dotted lines the rod, 381, connected at its forward end to the power applying lever, 387, at 382ˣ, much nearer to the point of pivoting, 387, than the position shown in full lines, in which case the amount of reaction applied to the pedal lever will be proportionately greater at each point in the power stroke of the actuator than would be the case with the construction illustrated in full lines. It will be understood that if the brake rod, 381, should be connected to the power applying lever, 387, at a point above its connection with the rod, 386, as indicated in dotted lines for example at 382ʸ, there would be no reaction on the pedal, but on the contrary the operation of the power actuator will have the tendency to push the pedal away from the operator's foot. In the construction shown in Fig. 7, we find it convenient to provide the power applying lever, 387, with a plurality of apertures as indicated, so that the rod, 381, can be connected at such a point in the lever, 387, as to give the desired amount of reaction, or the rod, 305, may be connected at the same point as the rod, 386, to increase the reaction, if desired.

We also wish it to be understood that in any of the constructions illustrated herein, the movable member of the actuator not connected with the lever pivoted to the pedal, may, if desired, be connected with a rigid part of the chassis. In such case, the brakes would be operated by the movable actuator member connected with said lever, and no power would be transmitted from the other member of the power actuator. In Fig. 8, in which the parts corresponding to those in Figs. 1 and 2 are given the same reference numerals with the addition of 400, we have shown diagrammatically, an arrangement like that illustrated in Fig. 2, except that the piston rod, 5, is in this case connected with a fixed part of the chassis, as bracket, 487ª, which is slotted or recessed to accommodate the rod, 486. It will be seen that the operation will be just the same as that previously described with reference to Figs. 1 and 2, except that as the cylinder alone moves the power of the actuator will be applied wholly by the cylinder through the amplifying lever, 484, and rod, 486, and the differential of fluid pressures on the piston will be without any effect on the brake mechanism.

What we claim and desire to secure by Letters Patent is:—

1. In a brake system for automotive vehicles, the combination with brake mechanism, a fluid pressure operated actuator comprising members having relative movement with respect to each other, a physically operable part mounted on a fixed pivotal support, of a lever pivoted to said physically operable part eccentrically to the pivotal support of the latter, connections from said lever to a movable member of the actuator and to the brake mechanism, constructed to exert a reactionary force on the physically operable part through the pivotal connection of said lever therewith, and controlling valve mechanism located outside of the actuator and interposed between said physically operable part and said lever.

2. In a brake system for automotive vehicles, the combination with brake mechanism, a fluid pressure operated actuator comprising members having relative movement with respect to each other, controlling valve mechanism for the actuator, a physically operable part pivotally supported on a fixed pivot and operatively connected with said valve mechanism, of a lever pivoted to said physically operable part eccentrically to the pivotal support of the latter, and connections from said lever to a movable member of the actuator and to the brake mechanism constructed to exert a reactionary force on the physically operable part through the pivotal connections of said lever therewith, said valve mechanism having relatively movable parts connected respectively with said physically operable part and said lever, and supported thereby.

3. In a brake system for automotive vehicles, the combination with brake mechanism, a fluid pressure operated actuator comprising members having relative movement with respect to each other, a physically operable part mounted on a fixed pivotal support, of a lever pivoted to said physically operable part eccentrically to the pivotal support of the latter, connections from said lever to a movable member of the actuator and to the brake mechanism constructed to exert a reactionary force on the physically operable part through the pivotal connection of said lever therewith, controlling valve mechanism interposed between said physically operable part and said lever, and means for limiting the relative movement between said physically operable part and said lever.

4. In a brake system for automotive vehicles, the combination with brake mechanism, a fluid pressure operated actuator comprising members having relative movement with respect to each other, controlling valve mechanism for the actuator, a physically operable part mounted on a fixed pivotal support, of a lever pivoted to said physically operable part eccentrically to the pivotal support of the latter, and connections from said lever to a movable member of the actuator and to the brake mechanism constructed to exert a reactionary force on the physically operable part through the pivotal connection of said lever therewith, said valve mechanism being provided with relatively movable parts and means for limiting the relative movement thereof, the relatively movable parts of the valve mechanism being connected respectively to the physically operable part and said lever and supported thereby.

5. In a brake system for automotive vehicles, the combiantion with brake mechanism, a fluid pressure operated actuator comprising members having relative movement with respect to each other, controlling valve mechanism for the actuator, a physically operable part mounted on a fixed pivotal support, and operatively connected with said valve mechanism, of a power amplifying lever pivoted between its ends to said physically operable part at a distance from the pivotal support of the latter, the arms of said lever being connected respectively to a movable member of the actuator and to the brake mechanism to amplify the power transmitted thereto, and exert a reactionary force on said physically operable part through the pivotal connection of said lever therewith, said valve mechanism being interposed between and supported by the said physically operable part and said lever.

6. In a brake system for automotive vehicles, the combination with brake mechanism, a fluid pressure operated actuator comprising members having relative movement with respect to each other, controlling valve mechanism for the actuator, a physically operable part mounted on a fixed pivotal support and operatively connected with said valve mechanism, of a power amplifying lever pivoted between its ends to said physically operable part at a distance from the pivotal support of the latter, the arms of said lever being connected respectively to a movable member of the actuator and to the brake mechanism to amplify the power transmitted therethrough, and exert a reactionary force on said physically operable part through the pivotal connection of said lever therewith, said valve mechanism having relatively movable parts connected respectively with the physically operable part and with said power amplifying lever and supported thereby.

7. In a brake system for automotive vehicles, the combination with brake mechanism, a fluid pressure operated actuator comprising members having relative movement with respect to each other, controlling valve mechanism for the actuator, a physically operable part pivotally supported on a fixed pivot and operatively connected with said valve mechanism, of a power amplifying lever pivoted between its ends to said physically operable part at a distance from the pivotal support of the latter, the arms of said lever being connected respectively to a movable member of the actuator and to the brake mechanism to amplify the power transmitted thereto, and exert a reactionary force on said physically operable part through the pivotal connection of said lever therewith, said valve mechanism having relatively movable parts connected respectively with the physically operable part and with said power amplifying lever and supported thereby, and means for limiting the relative movement between said physically operable part and said lever.

8. In a brake system for automotive vehicles, the combination with brake mechanism, a fluid pressure operated actuator comprising two relatively movable members, both of which are movable with respect to the vehicle, controlling valve mechanism, and a pedal lever operatively connected with the valve mechanism and pivotally supported on a fixed pivot, of a power amplifying lever pivotally connected between its ends with and supported by the pedal lever, means for connecting one of the actuator members to the brake mechanism, said amplifying lever having one arm connected with said brake mechanism, and the other arm connected to the other of said actuator members, the pivotal connection between said levers being located at a distance from the fixed pivot of the pedal and so disposed with relation thereto that the power transmitted from the actuator through said amplifying lever will exert a reactionary force on said pedal lever.

9. In a brake system for automotive vehicles, the combination with brake mechanism, a fluid pressure operated actuator comprising two relatively movable members, both of which are movable with respect to the vehicle, controlling valve mechanism, and a pedal lever mounted on a fixed pivotal support, of a power amplifying lever pivotally connected between its ends with and supported by the pedal lever, means for connecting one of the actuator members to the brake mechanism, said amplifying lever having one arm connected with the said brake mechanism, and the other arm connected to the other of said actuator members, the pivotal connection between said levers being located at a distance from the fixed pivot of the said pedal lever and so disposed with relation thereto that the power transmitted from the actuator through said amplifying lever will exert a reactionary force on said pedal lever, said valve mechanism having relatively movable parts connected respectively with the pedal lever and power amplifying lever.

10. In a brake system for automotive vehicles, the combination with brake mechanism, a fluid pressure operated actuator comprising two relatively movable members, both of which are movable with respect to the vehicle, controlling valve mechanism, and a pedal lever mounted on a fixed pivotal support, of a power amplifying lever pivotally connected between its ends with and supported by the pedal lever, means for connecting one of the actuator members to the brake mechanism, said amplifying lever having one arm connected with the said brake mechanism, and the other arm connected with the other of said actuator members, the pivotal connection between said levers being located at a distance from the fixed pivotal support of the pedal lever, and so disposed with relation thereto that the power transmitted from the actuator through said amplifying lever will exert a reactionary force on said pedal lever, said valve mechanism having relatively movable parts connected respectively with the pedal lever and power amplifying lever, and means for limiting the relative movement between the pedal lever and the power amplifying lever.

11. In a brake system for automotive vehicles, the combination with brake mechanism, a fluid pressure operated actuator comprising members having relative movement with respect to each other, controlling valve mechanism for the actuator, a physically operable part mounted on a fixed pivotal support and operatively connected with said valve mechanism, of a lever pivoted to said physically operable part eccentrically to the pivotal support of the latter, and connections from said lever to a movable member of the actuator and to the brake mechanism constructed to exert a reactionary force on the physically operable part through the pivotal connection of said lever therewith, said valve mechanism having parts exposed to differentials of fluid pressures corresponding with those in the actuator during a power stroke thereof, and transmitted to the physically operable part as a reactionary force in addition to that exerted through said lever.

12. In a brake system for automotive vehicles, the combination with brake mechanism, a fluid pressure operated actuator comprising members having relative movement with respect to each other, controlling valve mechanism for the actuator, a physically operable part pivotally supported on a fixed pivot and operatively connected with said valve mechanism, of a power amplifying lever pivoted between its ends to said physically operable part at a distance from the pivotal support of the latter, the arms of said lever being connected respectively to a movable member of the actuator and to the brake mechanism, to amplify the power transmitted thereto, and exert a reactionary force on said physically operable part through the pivotal connection of said lever therewith, said valve mechanism having parts exposed to differentials of fluid pressures corresponding with those in the actuator during a power stroke thereof, and transmitted to the physically operable part as a reactionary force in addition to that exerted through said power amplifying lever.

13. In a brake system for automotive vehicles, the combination with brake mechanism, a fluid pressure operated actuator comprising two relatively movable members, both of which are movable with respect to the vehicle, controlling valve mechanism, and a pedal lever operatively connected with the valve mechanism and pivotally supported on a fixed pivot, of a power amplifying lever pivotally connected between its ends with and supported by the pedal lever, means for connecting one of the actuator members to the brake mechanism, said amplifying lever having one arm connected with the said brake mechanism, and the other arm connected with the other of said actuator members, the pivotal connection between said levers being located at a distance from the fixed pivot of the pedal lever, and so disposed with relation thereto that the power transmitted from the actuator through said amplifying lever will exert a reactionary force on said pedal lever, said valve mechanism having parts exposed to differentials of fluid pressures corresponding to those in the actuator during a power stroke thereof, and transmitted to the physically operable part as a reactionary force in addition to that exerted through said power amplifying lever.

14. In a brake system for automotive vehicles, the combination with brake mechanism, a fluid pressure operated actuator comprising two relatively movable members, both of which are movable with respect to the vehicle, controlling valve mechanism, and a pedal lever pivotally supported on a fixed pivot, of a power amplifying lever pivotally connected between its ends with and supported by the pedal lever, means for connecting one of the actuator members to the brake mechanism, said amplifying lever having one arm connected with the said brake mechanism, and the other arm connected with the other of said actuator members, the pivotal connection between said levers being located at a distance from the fixed pivot of the pedal lever and so disposed with relation thereto that the power transmitted from the actuator through said amplifying lever will exert a reactionary force on said pedal lever, said valve mechanism having relatively movable parts connected respectively with the pedal lever and with the power amplifying lever, and supported thereby, said valve parts being subjected to differentials of fluid pressures corresponding to those in the actuator during a power stroke thereof, and exerting a reactionary force on the pedal lever in addition to the reactionary force exerted through said power amplifying lever, and means for limiting the relative movement between the pedal lever and the power amplifying lever.

15. In a brake system for automotive vehicles, the combination with brake mechanism, a fluid pressure operated actuator comprising members having relative movement with respect to each other, a physically operable part mounted on a fixed pivotal support, of a lever pivoted to said physically operable part eccentrically to the pivotal support of the latter, connections from said lever to a movable member of the actuator and to the brake mechanism, constructed to exert a reactionary force on the physically operable part through the pivotal connection of said lever therewith, and controlling valve mechanism having relatively movable parts connected respectively with said physically operable part and said lever.

16. In a brake system for automotive vehicles, the combination with brake mechanism, a fluid pressure operated actuator comprising members having relative movement with respect to each other, controlling valve mechanism for the actuator, a physically operable part pivotally supported on a fixed pivot and operatively connected with said valve mechanism, of a lever pivoted to said physically operable part eccentrically to the pivotal support of the latter and connections from said lever to a movable member of the actuator and to the brake mechanism constructed to exert a reactionary force on the physically operable part through the pivotal connections of such lever therewith, said valve mechanism having relatively movable parts connected respectively with said physically operable part and said lever.

17. In a brake system for automotive vehicles, a combination with brake mechanism, a fluid pressure operated actuator comprising members having relative movement with respect to each other, controlling valve mechanism for the actuator, a physically operable part mounted on a fixed pivotal support and operatively connected with said valve mechanism, of a power amplifying lever pivoted between its ends to said physically operable part at a distance from the pivotal support of the latter, the arms of said lever being connected respectively to a movable member of the actuator and to the brake mechanism to amplify the power transmitted therethrough and exert a reactionary force on said physically operable part through the pivotal connection of said lever therewith, said valve mechanism having relatively movable parts connected respectively with the physically operable part and with said power amplifying lever.

CALEB S. BRAGG.
VICTOR W. KLIESRATH.